March. 15, 1938.   W. LEWIS   2,111,026
SPRING MATTRESS
Filed March 2, 1934
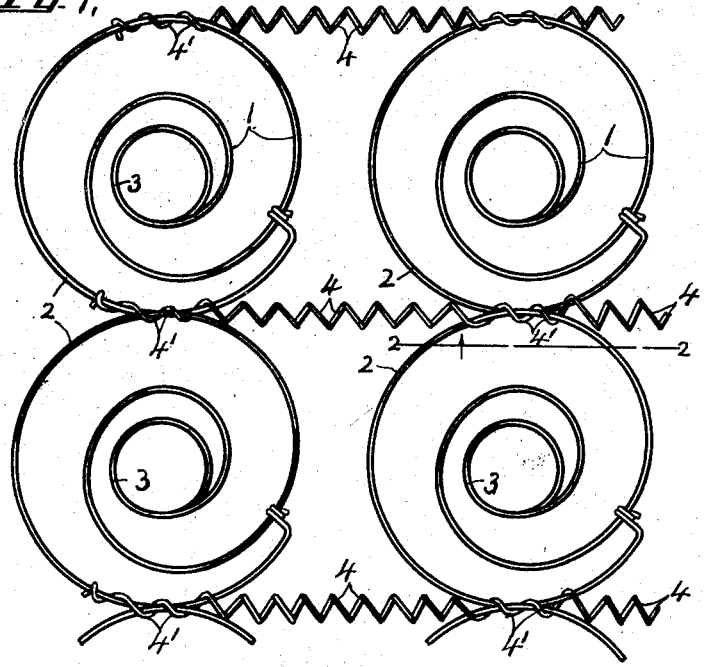
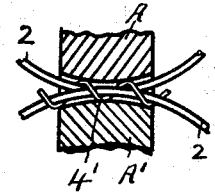
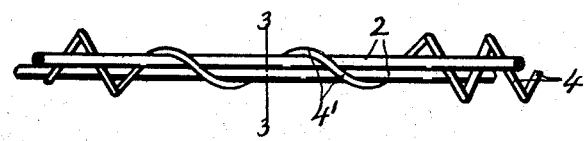
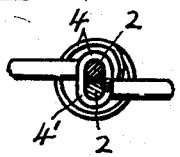
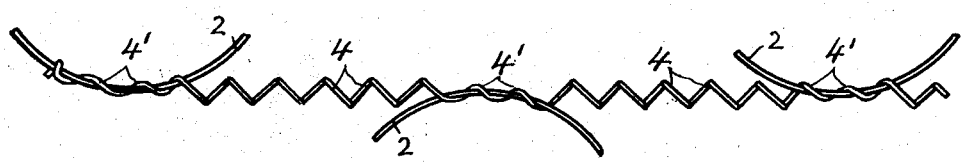
INVENTOR
Wm Lewis
by
Hogut & Neary
ATTORNEYS
WITNESS
J. J. Mains Patented Mar. 15, 1938

2,111,026

UNITED STATES PATENT OFFICE 2,111,026

SPRING MATTRESS

William Lewis, Utica, N. Y.

Application March 2, 1934, Serial No. 713,705

3 Claims. (Cl. 5—269)

This invention relates to a spring mattress involving the use of a system of coil springs arranged side by side in parallel rows with their axes in parallel relation and the springs of each row in sufficiently spaced relation to avoid contacting with each other, together with helical tie springs extending along contiguous sides of the springs of adjacent rows and interlaced with the end convolutions thereof for yieldingly holding the coil springs in their normal relation with their axes in parallelism and at the same time allowing free axial and tilting movement of the convolutions of the several springs.

These helical tie springs are of relatively small diameter as compared with that of the main coil springs and are usually interlaced with the contacting portions of the end convolutions of adjacent rows by screwing the same endwise thereon so that the axes of the tie springs will be substantially tangential thereto.

As heretofore constructed, the inner diameters of the helical tie springs have been considerably greater than the cross sectional areas of the contiguous portions of the convolutions with which they are interlaced, thus allowing said convolutions to slide endwise or circumferentially and also radially relatively to each other and to the helical tie springs resulting in objectionable grating noise when the mattress is in use and also allowing objectionable displacement of the connected portions of the coil springs relatively to each other.

The main object of the present invention is to reduce the diameters of the interlaced portions of the helical tie springs to approximately the same cross sectional area as the contacting portions of said convolutions to hold the latter against relative circumferential or radial movement while the remaining portions of the helical tie springs retain their normal relatively larger diameters and resiliency and thereby assist in retaining the main coil springs in their normal relation with their axes in parallelism.

Another object is to provide simple means whereby the different portions of the helical tie springs may be expeditiously compressed after they have been interlaced in the usual manner with the contiguous portions of the end convolutions of the main coil springs.

Other objects and uses relating to specific parts of the invention will be brought out in the following description.

In the drawing:—

Figure 1 is a top plan of a portion of one corner of a rectangular spring mattress, embodying the features of my invention.

Figure 2 is an enlarged detail vertical sectional view taken in the plane of line 2—2, Figure 1, showing the contiguous contacting portions of the upper convolutions of the main coil springs and my improved helical tie spring connecting the same.

Figure 3 is a transverse vertical sectional view taken on line 3—3, Figure 2, showing a portion of a helical tie spring as compressed upon the adjacent portions of the end convolutions of the adjacent main springs.

Figure 4 is a top plan of a portion of a modified form of spring mattress in which the main coil springs of adjacent rows are arranged in staggered relation instead of opposed relation, as shown in Figures 1, 2 and 3.

Figure 5 is a top plan of the adjacent contacting portions of opposed convolutions of the main coil springs together with the adjacent portions of one of the helical tie springs and showing in section and partly broken away a pair of dies for compressing the adjacent portion of the helical tie spring upon the contiguous portions of the convolutions of the main springs.

As illustrated in Figures 1 to 3 inclusive, the spring mattress comprises a system of main coil springs 1 arranged in opposed relation and in parallel rows with their axes in parallelism and their corresponding end convolutions as 2 in parallel planes, each spring being preferably tapered from its ends toward the middle so that the intermediate convolutions as 3 will be of smaller diameter than the end convolutions, the contiguous sides of the opposed end convolutions being preferably arranged in overlapping contacting relation, as shown more clearly in Figures 2 and 3.

The contiguous contacting portions of adjacent rows are yieldingly connected by helical tie springs 4 interlaced therewith by screwing motion endwise so that the axis of each helical tie spring will be substantially tangential to said contiguous portions of the end convolutions 2 of the main spring 1, as shown more clearly in Figure 1.

After the helical tie springs 4 have been interlaced with the contiguous portions of the end convolutions of the main springs of adjacent rows, the interlaced portions thereof are compressed tightly upon said contiguous portions to firmly hold the end convolutions of the main springs against relative turning movement about their respective axes and also to prevent their relative radial movement.

Any suitable means may be employed for tightly compressing the interlaced portions as 4' of the helical springs 4 upon the adjacent portions of the convolutions 2 and in Figure 5 I have shown a pair of opposite dies A and A' for that purpose.

These dies may be operated toward and from each other in any suitable manner, not necessary to herein illustrate or describe, but are preferably placed in a horizontal or vertical position in such manner that the interlacing portions 4' and adjacent portions of the convolutions 2 may be successively placed between the dies to be compressed thereby when operated toward each other, as shown in Figure 5.

When the interlaced portions 4' of the helical tie springs 4 are compressed in the manner described, the interior diameter thereof will be substantially equal to the cross sectional area of the adjacent portions of the convolutions 2, as shown more clearly in Figure 3, while the remaining portions of the helical tie springs will retain their normal relative larger diameters, as indicated in Figure 3.

In Figure 4, the coil springs 4 of the adjacent rows are arranged in staggered relation with their end convolutions normally in parallel planes and the contiguous sides of adjacent rows in approximately the same plane parallel with their axes but spaced apart lengthwise of the rows in which case the helical tie springs 4 will be screwed endwise around and upon said contiguous portions and thereby interlaced therewith after which the interlaced portions will be tightly compressed thereon to hold the springs 1 against relative turning or radial movement without interfering with the free endwise and tilting movement of the end convolutions relatively to each other.

It will be noted that in Figure 1 the outermost tie spring 4 is interlaced with single thicknesses of the adjacent sides of the end convolutions 2 and that the reduced portions 4' are tightly compressed around and upon these single thicknesses to hold the connected parts against relative radial or lengthwise sliding movement one upon the other, the same being also true of the tie springs shown in Figure 4.

This tight compression of the helical tie springs at 4' around and upon the end convolutions of the main springs 1 after they have been interlaced therewith in the manner described constitutes an extremely simple method of obtaining a noiseless and highly resilient mattress in which the springs 1 are positively held against turning about their axes and also against radial movement relatively to the tie springs 4 which are also held against endwise sliding movement relatively to the springs 1 while the major portions of the tie springs retain their original relatively larger diameters for imparting added resiliency to the mattress.

Under these conditions the surfaces of the mattress will be free from abrupt obstructions to enable the covers to slide freely thereon without liability of being caught between the tie springs 4 and adjacent convolutions of the main springs 1 and incidentally reducing the wear and tear upon said covers all of which is a distinct and valuable advance in the manufacture and use of mattresses of this type.

What I claim is:

1. In a spring mattress, a plurality of parallel rows of coil springs, the springs of each row being spaced a sufficient distance apart to avoid contact with each other, said rows being arranged side by side and having portions of the end helixes of adjacent springs in the respective rows arranged in overlapping contacting relation, a helical tie spring extending longitudinally between each pair of rows substantially tangential to the overlapping portions of said helixes, said tie springs having portions of their turns intermediate the ends of the tie springs threaded about said overlapping helixes for hinging said helixes together and having portions of the turns threaded about said overlapping helixes tightly embracing and closely conforming to the combined dimensions of said overlapping helixes to hold the latter in contact and against relative endwise movement, the portions of the helical tie springs intermediate the coil spring-embracing portions having a diameter greater than the diameter of said embracing portions.

2. In a spring structure of the class described, the combination of a plurality of parallel rows of axially vertical coil springs, the springs of adjacent rows being arranged in transversely aligned relation, transversely aligned, adjacent springs having end coil portions substantially in mutually engaging relationship, and a helical wire extending in the direction of said rows and having groups of its turns threaded on said mutually engaged coil portions, one turn of each group of said turns being distorted so as to reduce its internal diameter in one direction to less than the combined thickness of the embraced coil portions to thereby prevent rotation of the helicals about said coil portions and also to thereby prevent snapping of one of the embraced coil portions past the other.

3. In a spring structure of the class described, the combination of a plurality of axially parallel coil springs arranged in a row, said springs having certain coils disposed in substantially coplanar relation, and means connecting the springs comprising a helical wire extending lengthwise of the row of springs and having successive groups of turns respectively threaded over substantially aligned side portions of the coplanar coils of said springs, the normal pitch of the turns of said helical wire being such as to permit free threading thereof on said portions of the coils, one turn of each of said groups being permanently distorted from said normal pitch to thereby cause certain turns of the helical wire to frictionally engage said coils, whereby the springs are frictionally held by the helicals against noise-producing movement relative to the latter.

WILLIAM LEWIS.